United States Patent
Brandwine et al.

(10) Patent No.: US 8,117,079 B1
(45) Date of Patent: Feb. 14, 2012

(54) OFFSETTING ENVIRONMENTAL IMPACT OF ELECTRONIC TRANSACTIONS

(75) Inventors: Eric Jason Brandwine, Haymarket, VA (US); Luis Felipe Cabrera, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/034,433

(22) Filed: Feb. 24, 2011

Related U.S. Application Data

(63) Continuation of application No. 12/888,139, filed on Sep. 22, 2010, now Pat. No. 7,917,400, which is a continuation of application No. 12/425,330, filed on Apr. 16, 2009, now Pat. No. 7,813,970.

(51) Int. Cl.
*G06Q 30/00* (2006.01)
(52) U.S. Cl. ..................................... 705/26.1
(58) Field of Classification Search .................. 705/26.1
See application file for complete search history.

(56) References Cited

U.S. PATENT DOCUMENTS

| | | | |
|---|---|---|---|
| 2004/0193470 A1* | 9/2004 | Nemoto et al. | 705/8 |
| 2004/0199545 A1 | 10/2004 | Wagner et al. | |
| 2008/0040182 A1 | 2/2008 | Wegner et al. | |

OTHER PUBLICATIONS

Ken Ruehrdanz; Modern Materials Handling. (Warehousing Management Edition). Boston: Oct. 2008. vol. 63, Iss. 10; p. 19, 1 pgs; "Time to re-think your supply chain?"; http://proquest.umi.com/pqdweb?did=1574966071&sid=3&Fmt=3&clientId=19649&RQT=309&VName=PQD.*

Entertainment & Travel. Atlanta: Jul. 7, 2008. p. 279 http://proquest.umi.com/pqdweb?did=1523625281&sid=1&Fmt+3&clientId=19649&RQT=309&VName=PQD.

* cited by examiner

*Primary Examiner* — Mila Airapetian
(74) *Attorney, Agent, or Firm* — Novak Druce + Quigg LLP

(57) ABSTRACT

The environmental impact of various transactions can be reduced or offset by determining the impact of various shipping and packaging options, and providing these options to customers. Customers then have the ability to select options that reduce the environmental impact of each transaction. A customer also can purchase environmental offsets to offset the determined impact. Customers can be provided with environmental impact information determined or tracked for each item viewed by the customer, such that each customer can be informed of the additional impact of each individual when making a selection. The selections and/or actions of a customer can be tracked such that environmentally friendly options and suggestions can be provided for subsequent transactions.

20 Claims, 6 Drawing Sheets

OFFSETTING ENVIRONMENTAL IMPACT OF ELECTRONIC TRANSACTIONS

CROSS-REFERENCE TO RELATED APPLICATIONS

This application is a continuation of co-pending U.S. patent application Ser. No. 12/888,139, entitled "Environmentally Conscious Transaction Determinations," filed Sep. 22, 1010, which is a continuation of U.S. patent application Ser. No. 12/425,330, entitled "Environmentally Conscious Electronic Transactions," filed Apr. 16, 2009, now issued U.S. Pat. No. 7,813,970, and is related to co-pending U.S. patent application Ser. No. 12/236,136, filed Sep. 23, 2008, entitled "Offsetting Environmental Effects of Computing," and co-pending U.S. patent application Ser. No. 12/236,160, filed Sep. 23, 2008, entitled "Automatically Minimizing Environmental Effects of Computing," each of which is hereby incorporated herein by reference in their entirety for all purposes.

BACKGROUND

As environmental conditions are becoming increasingly of concern to the general population, an increasing amount of attention is being paid to the environmental impact of various activities. Accordingly, more attention is being focused on the environmental impact of the manufacture, purchase, and disposal of goods and services. For example, emissions are introduced into the atmosphere through the delivery of items from a warehouse or other location. Further, there typically are packaging materials used for the delivery that may not be biodegradable, and thus introduce an amount of landfill volume into the environment. The goods or services themselves also have an environmental impact, as there generally is an amount of material used for an item that might not be biodegradable, there often is electricity required to produce an item that introduces additional emissions into the environment, etc.

Some companies have moved to lessen the environmental impact by using recyclable materials for packaging and/or shipping. Many delivery companies have also attempted to optimize the routes and vehicles used for shipping in order to reduce the amount of fuel needed for delivery. Other companies have placed warehouses in distributed locations in order to reduce the overall length of an average delivery route.

While these and other options might be provided by various companies, among other potential deficiencies, there often is little control given to the customer as to which options the customer would prefer.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to determining and/or managing the environmental impact of various aspects of transactions in an electronic environment. Systems and methods in accordance with various embodiments determine information about the environmental impact of various shipping and packaging methods, and provide a customer with options to reduce the environmental impact of such activities. Approaches in accordance with some embodiments also obtain information about the environmental impact of specific items, such that a potential customer can utilize this information when deciding amongst various items for consumption. Various embodiments also enable a customer to purchase environmental credits or offsets in order to compensate for the determined impact of any transaction. Various other environmentally-friendly options and aspects are provided in certain embodiments as discussed and suggested later herein.

Figure 1:
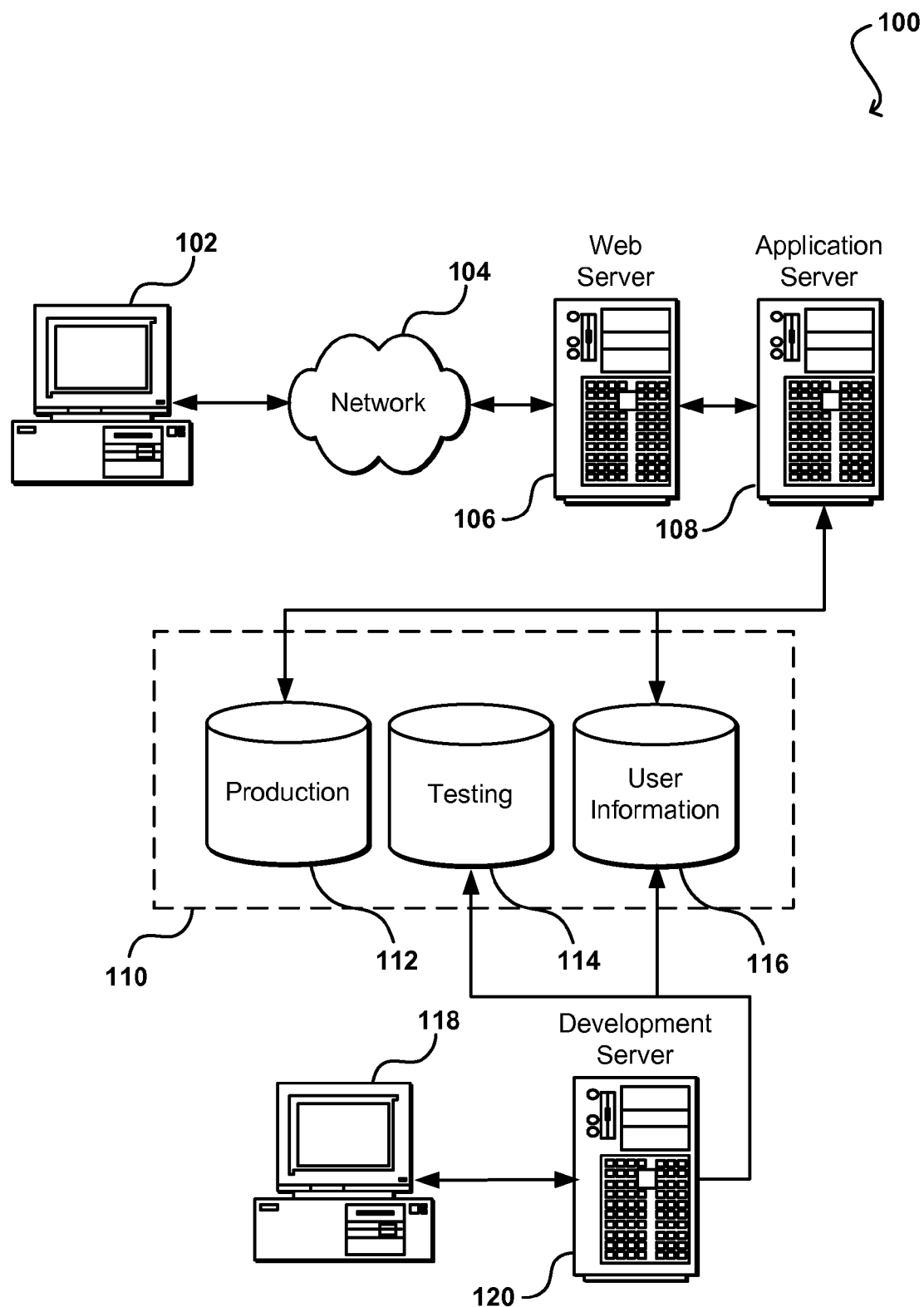
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that described with respect to FIG. 1 can be used to provide items for consumption by potential customers. As used herein, the term "item" can refer to anything, such as a product, service, or system, that can be ordered, purchased, rented, used, transferred, or otherwise consumed and/or accessed via a network request or electronic submission as part of an electronic transaction. A request can include any appropriate request sent over an appropriate system or network, such as a request submitted to a Web page over the Internet or a message sent via a messaging system to a content provider, for example.

A content provider, such as a provider of an electronic marketplace, may track various aspects of, and metrics for, the use of a site or other interface to the marketplace, for purposes such as cost and efficiency. As environmental concerns mount, these concerns will take a larger role in the decision process that consumers use when selecting items for consumption. It thus can be desirable to extend the metrics and/or aspects that are tracked by such systems. These metrics can include, for example, environmental factors such as carbon burden, landfill volume, biodegradable content, recyclable material, and noise pollution. Each of these factors is measurable, and can be derived from a combination of data that is already being tracked, as well as additional data. Tracking such information can provide not only additional ways to monitor cost and efficiency, but also to monitor the environmental impact of various operations, and provide this information to customers. Enabling customers to make informed decisions relating to environmental concerns, versus making decisions from retailers or other providers without such information, can provide a significant competitive advantage.

In one embodiment, the additional data used to track such metrics falls into at least two categories: conversion factors for new dimensions to be tracked for existing data (e.g., landfill volume for various types of packing material) and the obtaining of additional data that is not currently tracked (e.g., package delivery route miles for a particular transaction). Each conversion factor can be determined initially, as these factors typically will not change substantially over time. For example, the landfill volume of a particular cardboard box can be determined once, and that volume will remain substantially fixed as long as the type and size of box does not change. Further, the carbon burden per kilowatt-hour for a given power plant will vary through the year and over time, but the burden will not have to be evaluated for every KW-hr consumed. Likewise, the average fuel efficiency and carbon burden of a delivery vehicle will likely be near constant. Much of the new data, however, will vary on a per-item basis or a per-shipment basis.

Information pertaining to these metrics can be presented to customers in various fashions at various locations and times, such as during item discovery (e.g. searching, browsing, etc.) and at various points in an order pipeline for an electronic marketplace. Information relating to a specific item or group of items can be displayed on a page specific to an item, such as on an item detail page. This can include, for example, displaying the landfill volume and amount of non-biodegradable material for an item a customer is viewing. Presented with this information, customers can choose between products based at least in part upon these dimensions, a capability lacking in offerings from other conventional providers and/or systems. Further, features relating to a given order can be displayed in a virtual shopping cart page or any other appropriate display near the end of the ordering portion of a transaction. For example, a customer can see the carbon burden for various shipping and/or delivery types for the order, a landfill volume of the packing material required, or other such information. In some embodiments, certain information can be displayed to help the customer during the decision process. For example, a customer can be provided with calculated carbon burden, noise pollution, and other such information that would result if that customer were to purchase each item in the order from a physical or "brick and mortar" store. Customers then can see how much environmental impact will result from shopping electronically versus a brick and mortar store (or other acquisition options).

In an example in accordance with one embodiment, a customer of an electronic marketplace is able to send requests from a client device 102 over a network 104 that are received by an application server 108 to allow the customer to browse items offered by an electronic marketplace. Using any of a variety of methods known or used in the art, the customer is able to search for and browse any items offered by the marketplace. The customer can be presented with any appropriate information available for each item, and can determine which items the user would like to consume by placing a quantity of the item in a virtual shopping cart or other repository for items the customer intends to consume. When the customer is finished selecting items for a given transaction, the customer can be presented with an interface allowing the customer to select various options for the transaction.

It should be understood that various approaches exist within the scope of the various embodiments. For example, a customer can be enabled to select options before, during, or after items are selected for a transaction. For example, a user can specify to always use a certain type of shipping or packaging, or to favor a certain type of environmental factor. Thus, when the user is ready to complete the transaction, these shipping and/or packaging options can be provided by default. The user can, however, have the option to change these settings for specific transactions. In situations where a user only selects a single element (or small number of selectable elements) to complete a transaction, the system can utilize the options previously specified by the customer to complete the transaction without requiring entry of the information or selection of the options during the transaction. Advantages and features of various embodiments can be provided in such situations as well.

Figure 2:
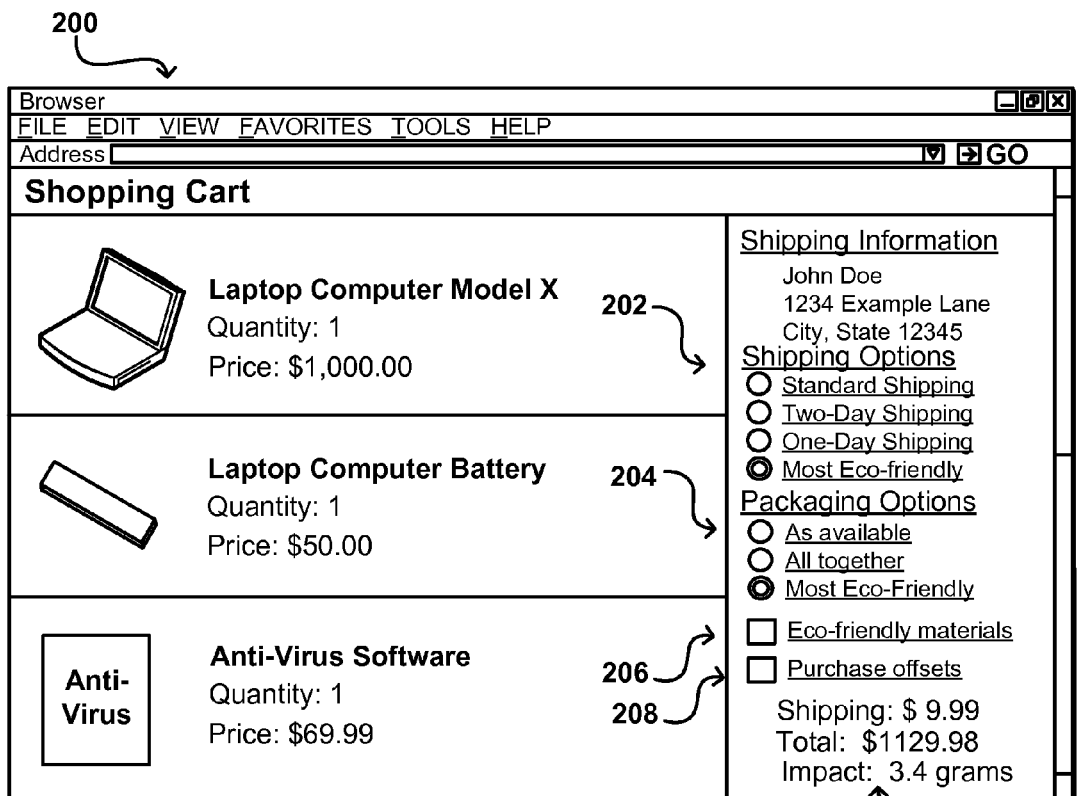
FIG. 2 illustrates an interface providing a customer with various shipping and packaging options that can be used in accordance with one embodiment.

FIG. 2 illustrates an example of such an interface 200 that can be generated for display to a customer during a transaction in accordance with one embodiment. In this example, a customer has added three items to a virtual shopping cart. Information for each of these items is displayed to the customer. In this embodiment, a customer must also specify or accept various shipping options before completing the ordering portion of the transaction. While the term "shipping" will be used throughout sections of the description for purposes of simplicity, it should be understood that any appropriate shipping or delivery approach can be used within the scope of the various embodiments. For example, items of digital content may be delivered via electronic transmission (e.g., over an Internet, intranet, or cellular connection) rather than traditional vehicle-based shipping approaches. Although these and/or other options can be provided at various points as discussed and suggested herein, the present example provides options relating to both shipping and packaging.

A first set of options 202 is displayed that allows the user to specify a type of shipping to be used for the transaction. In this example, a user can be presented with a number of conventional shipping options, such as standard shipping, two-day shipping, and overnight shipping. A user also can be presented with at least one other option specifying that an environmentally-friendly shipping option should be used. An "environmentally-friendly" or similar shipping option can be defined in any of a number of different ways, and a display such as that of FIG. 2 can provide an option for a customer to view information about why that shipping option is considered to be an environmentally conscious option.

In one example, two-day shipping might require the goods to be sent by plane to a major airport in relative proximity to the customer, and standard shipping might require a major shipping company to transport the item(s) by tractor trailer. A customer can be presented with a shipping option that might not be as fast, and might be more expensive, but that is more environmentally friendly in at least one way. For example, an environmentally friendly option might use a smaller shipping company that takes advantage of hybrid or hydrogen-powered vehicles, or that places items onto vehicles with empty space that are already scheduled for a particular route. Another option might be one that always uses low-emission vehicles, but that may make several stops along the way and thus might take more time. Some companies might only transfer items at night, or avoid routes through major cities, such that traffic would be lighter and the effect on air quality will be lessened. In some cases, a shipping company might hold a shipping vehicle at a certain location until a minimum percentage or other threshold amount of the vehicle is filled, in order to maximize the use of space and minimize the number of necessary trips, thus reducing the amount of fuel needed and the overall amount of emissions. Any of a number of other such approaches can be included as discussed or suggested herein.

In some cases, the company or provider of the marketplace, etc., will decide upon an environmentally friendly option, and provide that option to customers. In other cases, the provider might offer several different options from which a user can choose. For example, a customer might select an option to always use delivery mechanisms with hybrid vehicles when available. Another customer might select to have an item ship only when there will otherwise be wasted space on an existing route, such that the additional impact on the environment is negligible.

Another set of options 204 can be provided to a customer that allows the user to specify how the item(s) are to be packaged, which typically will be of importance when more than one item is ordered. For example, a customer can be provided with conventional options such as to ship all items together when they are available, or to ship the items separately as the items become available. Another option can be provided that indicates that the items should be shipped to minimize the environmental impact. There can be a number of ways to reduce the environmental impact of shipping a group of items.

For example, a first option might be to reduce the total number of packages shipped at different times, thus reducing the number of trips required. Another option might reduce the overall volume of the packaging, such that more packages can fit on a given delivery vehicle. Another option might be to group items to minimize the amount of packaging material needed. For example, three items might fit into a single box, but depending on the shape, size, composition, and/or volume of those items relative to the box there might need to be substantially more packaging material (e.g., peanuts) used for a single box than for two or three boxes. Also, boxes or other containers of certain sizes might be available that are made of recycled and/or biodegradable material, and an option can be to group items to favor use of these containers. The impact information can be updated and displayed with each additional item added to an order after the new packaging requirements are determined for the selected shipping method. Further, combinations of the shipping and packaging options can be analyzed to determine more accurate impact information and/or options. For example, selecting a certain type of packaging material might reduce the impact with respect to packaging, but might cause the item to have to be delivered on a different vehicle or using a different delivery approach such that the net environmental impact for the item actually increases, even though the customer was trying to reduce the impact. Thus, a combination with the lowest overall impact might not actually use the lowest impact shipping and/or packaging method.

A system in accordance with one embodiment further improves the overall accuracy of these shipping determinations by obtaining information about each type of item when one of those items enters a warehouse or other such location. Oftentimes, information from a manufacturer or provider is not entirely accurate. The overall size, weight, dimensions, materials, and other such aspects can actually differ from what is listed by a manufacturer or provider of a given item. Thus, accuracy of packaging and impact information can be improved by obtaining actual information for these items. For example, when a shipment of items comes in, at least one of each type of item can be weighed, measured, scanned, or otherwise analyzed to obtain easily determined objective information. In some cases, at least one of the items might also or alternatively be "pulled" from the shipment and provided in some way to a human user, who can determine at least one aspect of the item, such as whether the item appears to match description information for the item.

As part of the same option, or as a separate option 206, a customer can also specify to use environmentally friendly materials, even at additional cost to the customer. For example, a customer can specify to only use recycled and/or biodegradable materials to package the items. The customer also can have the ability to select packaging materials that were made in an environmentally friendly facility, such as a facility run using clean energy sources such as, but not limited to, solar or hydroelectric power. Also, a customer can have the ability to select materials made from trees grown on tree farms for the purposes of making packaging materials as opposed to natural forests, etc. Various other such options exist. As discussed above, in some cases a company can decide which packaging to use and/or offer to its customers. A customer also can specify to minimize packing material. While such an approach might not be desirable for a fragile object, if the customer orders a sweater or other non-breakable item then the customer can request that the item be shipping using less packing material, such as a biodegradable pouch instead of a box with packaging material inside.

Even when a customer attempts to limit the environmental impact, however, there still will be some impact due to the transaction. An approach in accordance with one embodiment provides a customer with the option 208 to purchase environmental credits necessary to offset at least some of the effects of the transaction. For example, based on the shipping and packaging options selected for the items to be shipped or otherwise provided, a total amount of carbon grams that will be generated 210, or other impact information, can be calculated and/or displayed to the user. A user can have the option of offsetting this amount, and/or other appropriate amounts, in order for the transaction to be essentially zero impact for at least one aspect. Given the impact information, a customer also can take the information and handle the impact as the user sees fit.

In one example, a customer can select an option to, directly or indirectly, buy "carbon credits" to offset the impact. Carbon credits in general are "units" that can be purchased to offset the release of carbon that can have a negative impact on the environment. Environmental credits are similarly available for other such emissions, such as ozone, hydrocarbons, carbon compounds, nitrous oxide, etc. Many companies offering such carbon credits perform activities that reduce the introduction of these emissions into the environment, and then apportion the costs over the amount of reduction. For example, a company might plant a certain number of trees, prevent a coal-burning plant from being built instead of a hydroelectric power plant, recover methane gas from a farm for use instead of fossil fuel, utilize carbon capturing chemicals, provide environmentally-friendly products to be used in place of highly-polluting products, or any of a number of other such activities. The costs, effectiveness, and other such factors may be subject to some amount of speculation, but users can be provided with options that allow them to select which type of carbon credits to be purchased.

In an example where customers can view a history of their transactions, each customer also can also be notified of the corresponding "environmental footprint." A customer might decide to purchase offsets when the net impact reaches a certain level. While the customer can have the ability to purchase these credits through the provider, marketplace, etc., the user also can have the option of obtaining these offsets independently and inputting the information confirming or tracking the purchase of those offsets into the system. For example, a customer might buy offsets from a third party and input information for the offsets into the system in order to keep track of the net impact of the transactions over time. In some embodiments, a customer might also be able to enter information such as each tree a customer plants, or any other action the customer takes to reduce environmental pollution. This provides the customer with some way to track the customer's overall impact, even though the tracking mechanism has no impact on the transaction or direct benefit to the electronic marketplace. Such functionality can serve a business purpose for the provider of the marketplace, however, as customers can be more likely to purchase from that marketplace so they can ensure they are minimizing the impact or footprint resulting from their transactions. Thus, the amount of traffic to the marketplace and resulting purchases can increase accordingly.

Figure 3:
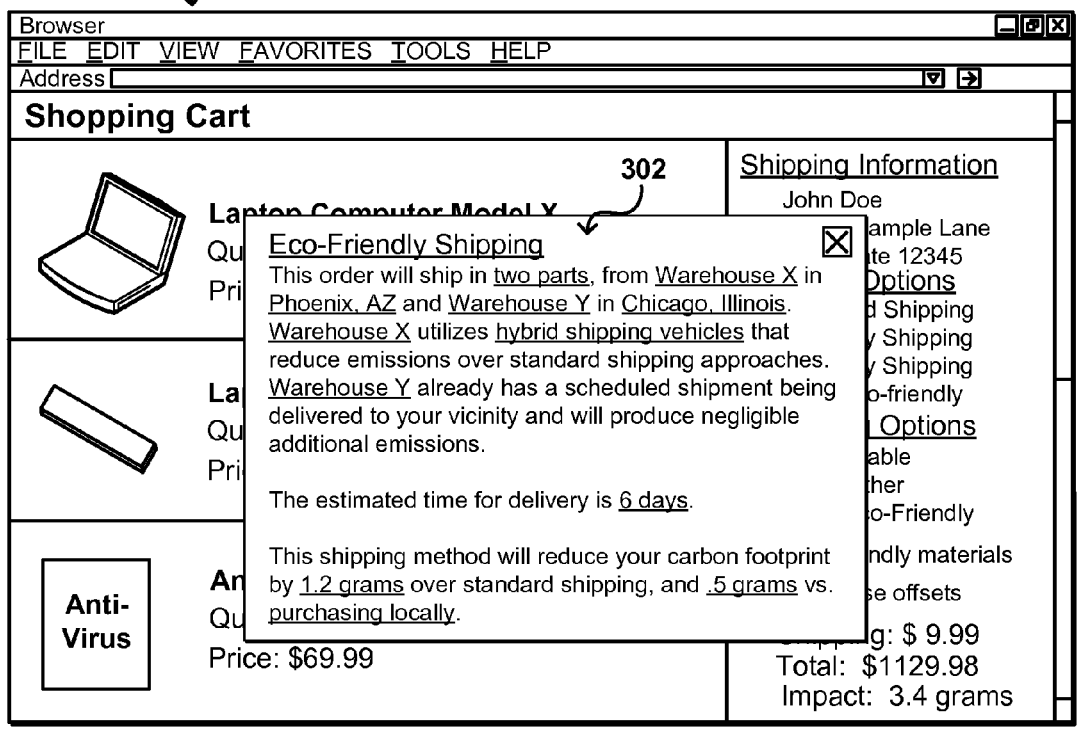
FIG. 3 illustrates an interface providing a customer with environmental impact information for a shipping option that can be used in accordance with one embodiment.

As discussed above, aspects that make something "eco-friendly" can be controversial, such that it can be desirable to provide a customer with the information used to make the determination. FIG. 3 illustrates an example interface 300 wherein a user selects an option to view information regarding the "eco-friendly" shipping option. In this example, a pop-up or modal window 302 is displayed, although new pages, frames, or other types of displays can be presented as well. The window in this case includes information that can be determined for the specific order, based on information such as the location of the customer and stock of items in the order.

For example, an algorithm can be used that takes into account the shipping destination for each item, as well as the available locations from which each item can ship, type of locations from which the item is available, possible delivery routes and mechanisms, and/or any other such information. The algorithm can then calculate environmental impact information for the various inputs, and determine a shipping approach that minimizes at least one environmental factor, such as the amount of carbon reduction by using the determined shipping approach as opposed to a standard or other shipping approach. A user then can view the amount of impact reduction versus the additional shipping cost, as well as information about the reduction, and determine whether to use the eco-friendly option. Even when the reduction is not significant, a customer still might prefer to use hybrid vehicles or might have other such preferences.

Such a system also can track other metrics, such as the distance that an item travels from the manufacturer to any given warehouse. It is quite possible that warehouse A might be closer to the customer than warehouse B, but the total distance from the manufacturer to the customer might actually be shorter via warehouse B. Further, there may be other aspects such as warehouse B being along a major rail route and warehouse A requiring truck transportation through a mountainous region, such that the overall impact of selecting items from warehouse B can be less than from warehouse A. Various other aspects can be accounted for and figured into the options and/or presented to the customer.

As mentioned briefly above, another algorithm can be used that can compare the impact of shopping electronically versus buying the item in a traditional "brick and mortar" store. For example, the algorithm can use the customer's address and/or the shipping address to determine nearby locations from which the customer could purchase each item if driving to the store and purchasing the item. In one embodiment, the algorithm can determine the nearest store (by way of driving mileage) with the item in stock, can use information such as the type of car the customer drives (if the customer has input such information) or an average type of vehicle, can compare the impact of the customer driving to the store and back, and can compare this with the impact from purchasing electronically to provide an overall impact reduction from purchasing electronically. In other embodiments, the algorithm can look to more typical buying patterns, such as a customer driving to 2-3 nearby stores before finding an item of desire in stock, in the right size, etc., and calculating the average impact reduction by purchasing electronically. For example, if a customer is looking for an item of clothing then the user might have to drive, on average, to the three nearest retailers to find an item that meets the customer's criteria. The algorithm can determine three nearby retailers, determine the impact, and then compare the impact with the impact of buying electronically and provide this information to the customer. In some embodiments, a mapping program might be used to calculate the best route to each of the selected stores, and the routes can be displayed to the customer along with the total impact information. In some embodiments, a customer might also be able to specifically input or select nearby stores at which the customer typically would shop for any particular category of items. Such information can be used to more accurately predict the impact and/or savings by purchasing electronically versus what the customer would otherwise likely do.

Figure 4:
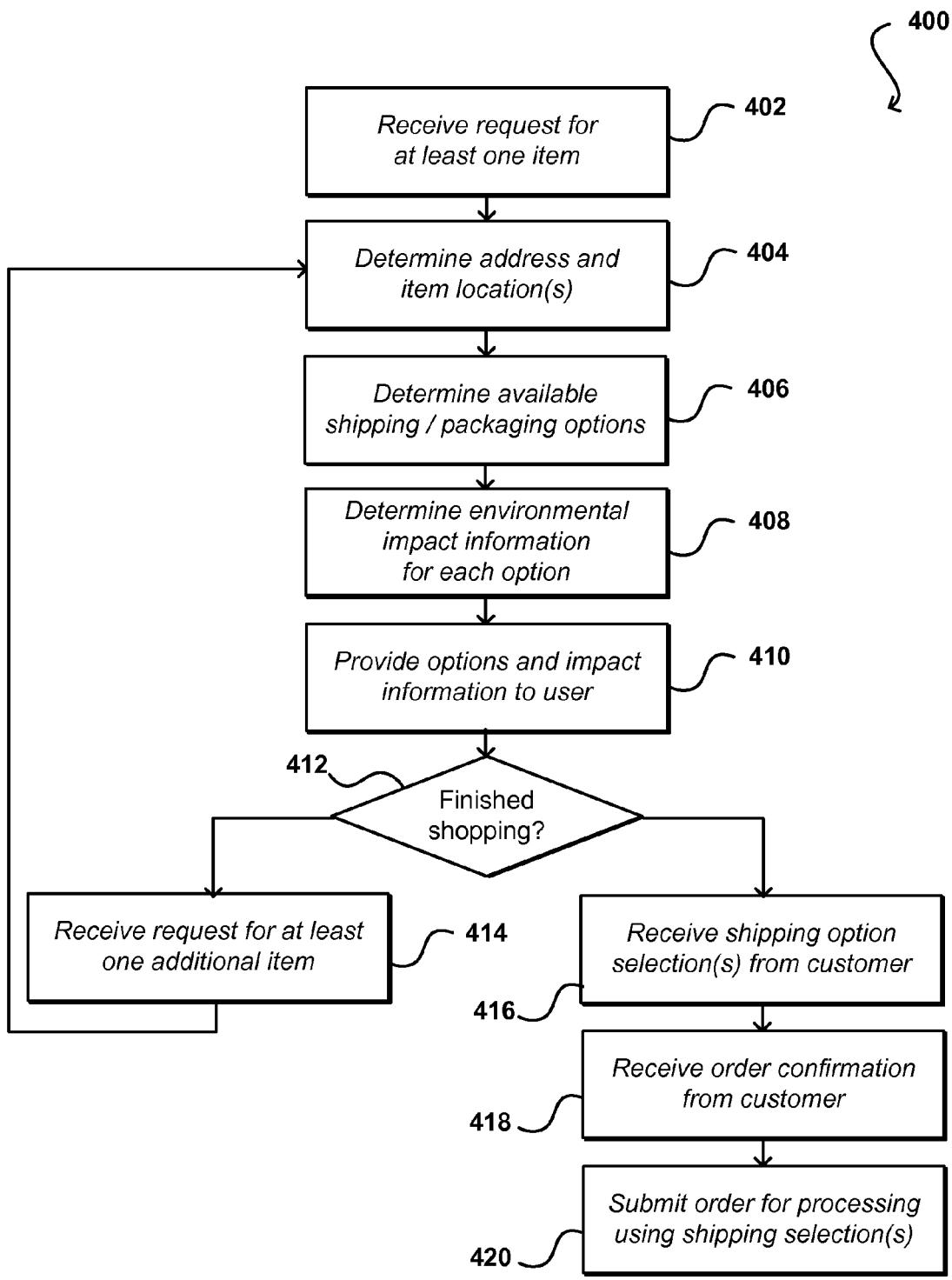
FIG. 4 illustrates a process for providing environmentally conscious shipping options that can be used in accordance with one embodiment.

FIG. 4 illustrates an example of a process 400 taking advantage of such functionality and information that can be used to enable a customer to determine and/or adjust the environmental impact of an electronic transaction in accordance with one embodiment. In this example 400, a request for at least one item is received for a customer 402. As discussed above, this can take the form of a request submitted when a customer adds an item to a virtual shopping cart, for example. A determination can be made as to the address to which each item is to be shipped, as well as a location from which each item is available to ship 404. Using the address, location, and availability information, among other appropriate information, available shipping and/or packaging options for the order can be determined 406. These can include, for example, shipping options based on time or type of shipment, and/or packaging options for the various items. For each shipping and/or packaging option, information relating to a corresponding environmental impact can be determined 408. As discussed, this can take advantage of information such as shipping distance, type of shipping vehicle, type of packaging material, and any other appropriate information discussed or suggested elsewhere herein. The determined shipping and/or packaging options and impact information then can be presented to the customer 410. In this example, the customer may not yet be done shopping 412, or there may yet be items to be added for the transaction, such that at least one other request for an item can be received 414 and the options and impact information can be recalculated and/or updated to include the new selection of items. Once all items for the transaction have been added (or during the process in some embodiments), a shipping and/or packaging option is received from the customer 416. In some embodiments, a customer must specify a setting for each option, while in other embodiments there can be default values that will be applied unless a customer selects otherwise. When all the shipping and/or packaging options are specified to the customer's satisfaction, a confirmation can be received from the customer for the order 418. This can be a result of the customer selecting an order submit selection or similar option, for example. Once the customer has confirmed the order, the order can be submitted for processing 420. As discussed, there can be several additional and/or alternative steps that can be used with these or fewer steps in any appropriate order, in accordance with various embodiments. For example, a customer can be provided with options to purchase offsets, compare impact information for various items, request additional information for shipping options, etc.

In addition to minimizing the impact of shipping, packaging, or other such aspects relating to a transaction, a customer also might like to minimize the impact resulting from the actual items selected for consumption. For example, a user might prefer to purchase items that are more environmentally friendly than other items. In many cases, a customer might not be able to easily tell how much of an impact or footprint that any given item might have. There also is no easy way for a customer to compare or sort products by their environmental impact or other such factors.

Systems and methods in accordance with various embodiments obtain and track environmental impact and/or similar information about items offered for consumption. Maintaining such information allows users to perform functions such as search for items by specific types of information, sort by environmental impact data, compare the impact of various items, and other such information. Offering environmental impact information and related functionality also can help to obtain good relations and provide positive marketing material for a provider of such information.

Figure 5:
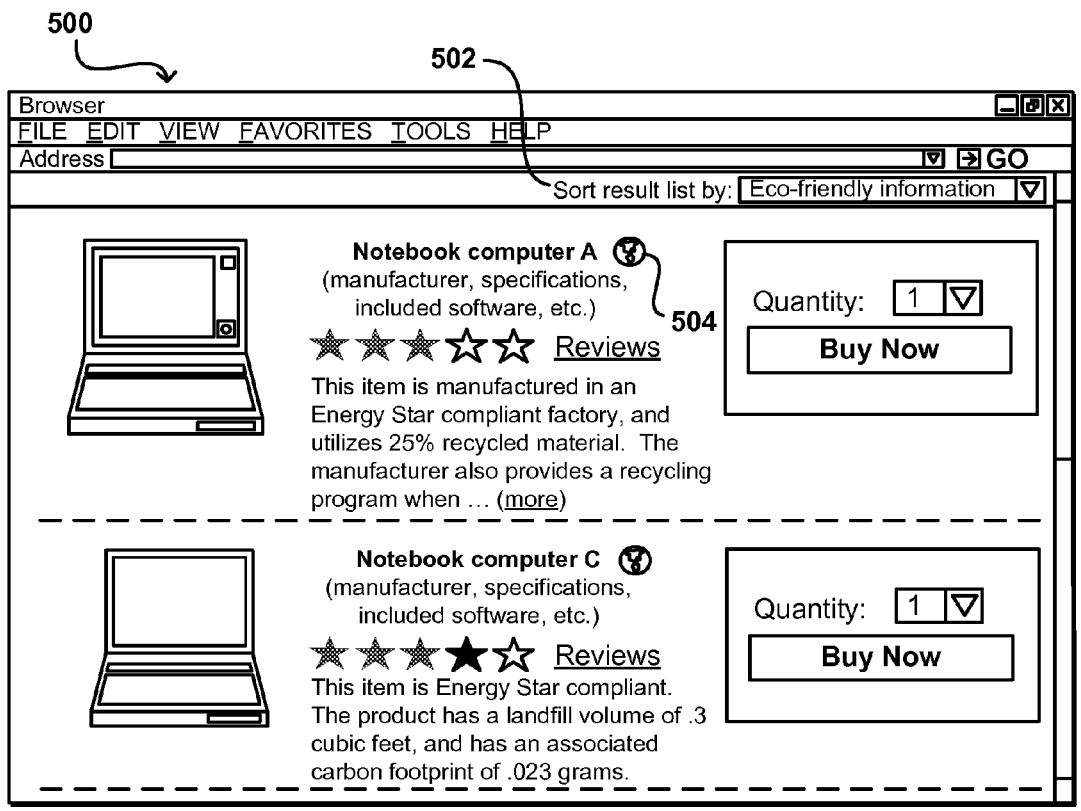
FIG. 5 illustrates an interface allowing a user to sort items by environmental information that can be used in accordance with one embodiment.

FIG. 5 illustrates an example of an interface 500 that can be used to allow a customer searching or browsing for an item to sort items based on environmental information in accordance with one embodiment. In a first embodiment, a user might be able to use a user-selectable option or element 502 to sort items by the environmental information available. For example, a first approach involves showing only items for which environmental impact information is available, or at least showing all such items before, or more prominently than, any other items. In one embodiment, any item with environmental information available can have an icon 504 or other indicia of such information being available for that item. In some embodiments, this icon can be selectable by a user such that the environmental information can be displayed by a user selecting, hovering a cursor over, or otherwise interacting with the element. Another approach involves sorting by the amount of information available. For example, if one item has information about the carbon footprint, landfill volume, and amount of recycled material, then that item might appear higher or prominently in the results than another item with less information, even though the other item might actually be more environmentally friendly.

Another approach enables users to sort by any objective criteria, such as carbon footprint, landfill volume, the delivery impact from the manufacturer of the item to a current warehouse or other storage facility (including information such as distance and fuel consumption), and the operational impact of the item (such as the average power consumption of the item over a given period of time). Such information can be obtained by the manufacturer, or more advantageously provided by a neutral party for purposes of consistency and accuracy. Other approaches can allow a user to sort by overall "environmentally friendliness." Such an approach can be controversial, however, as such criteria can be extremely subjective and can harm relationships with manufacturers of specific items. In many systems, it can be desirable to enable a user to compare the available information and make an independent decision.

Figure 6:
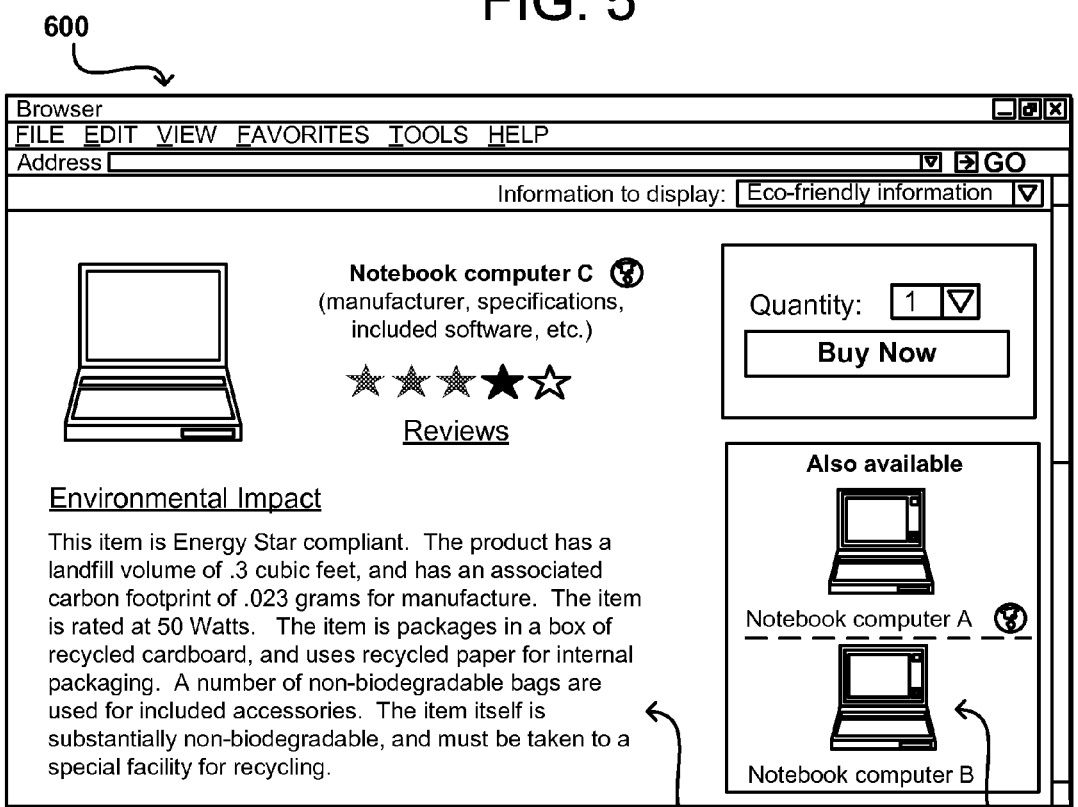
FIG. 6 illustrates an interface displaying environmental information for an item that can be used in accordance with one embodiment.

As mentioned, a user can be provided with the available environmental impact information for any item of interest for which that information is available. FIG. 6 illustrates an example of an interface page 600, such as an item detail page, wherein at least some of the environmental impact information is displayed to the customer. The information 602 can be provided in any appropriate form and manner, such as a paragraph or bullet list. In some embodiments, each piece of information is stored separately in a data store, such that the environmental information can be assembled dynamically in response to a request, enabling the information to be as current as possible. Such functionality also enables the maintaining of such information to be scalable and flexible, while also avoiding the need for a user to create specific text or paragraphs of information for each item. In one embodiment, a set of templates is provided that can be filled in with the appropriate environmental information.

In some embodiments, customer preferences can be saved and/or tracked in order to recommend certain items to a customer. For example, if a customer has indicated that the customer prefers items that are environmentally friendly, the customer chooses environmentally friendly shipping options, or if the customer tends to view and/or purchase items that are environmentally friendly, then when that customer views a detail page for an item such as is shown in FIG. 6, such environmentally friendly information can be input to an algorithm or process for determining aspects of the page. For example, a featured offer for the item can be based at least in part upon the environmental information available for each item or offer eligible to be featured. For example, if an item is offered from three providers, the offer selected to be featured on the page can be selected based on factors such as where the provider is located with respect to the customer and how the provider ships the item, such that even for identical items a customer can choose to purchase from the provider which is most environmentally friendly. In other cases, similar items 604 can be suggested to the customer on a detail page, for example, where those items might be more environmentally friendly in at least one aspect, or where ecological impact information is available such that the customer can make an informed decision. Such approaches may not result in the highest amount of profit for a provider of the marketplace, for example, for any given item, but offering items that are more likely to be purchased by a customer can help to improve marketing, goodwill, and the number of impressions, each of which can help to improve the overall level of business and/or transactions.

Figure 7:
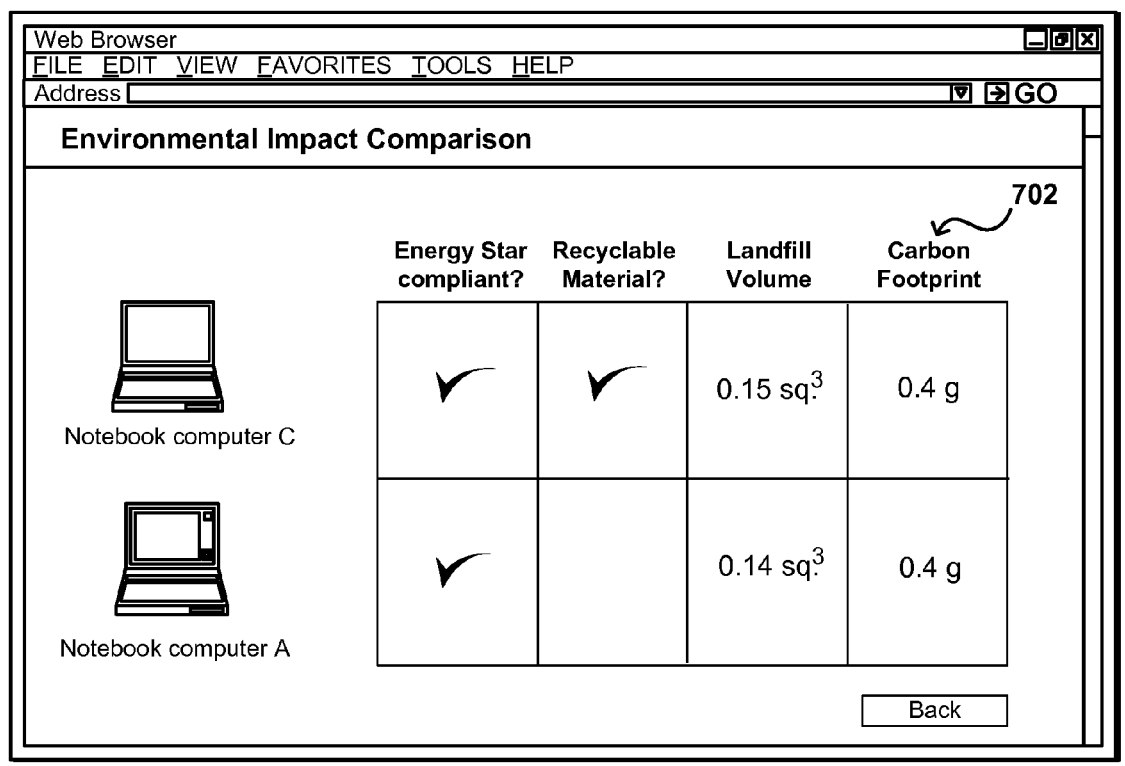
FIG. 7 illustrates an interface for comparing impact information for items that can be used in accordance with one embodiment.

In order to allow a customer to more easily compare items, system and methods in accordance with various embodiments can enable users to directly compare selected items based upon the available environmental information. FIG. 7 illustrates an example of an interface page 700 wherein a customer has sent a request to compare two specific items. Methods for selecting items to compare, such as by clicking a radio button or checkbox next to each item, are known in the art and will not be discussed herein in detail. As shown in the interface page 700, an image or other identifying information for each item is displayed, along with available environmental impact information for each item. In this example, both items are shown to be Energy Star compliant, but only one is shown to include recyclable material. This can be a result of the other item either not including recyclable material, or there not being information available that there is recyclable material in the item. Other ways can be used for such designation as should be apparent, such as by using "N/A" if there is no information available or if the criterion is not applicable, or using an "X" if the item does not contain recyclable material, for example. Other criteria such as landfill volume and carbon footprint can display the actual values, where available. In some embodiments, the customer can select on a criteria, such as the carbon footprint heading 702, which can cause the table or other grouping of information to be sorted by that criterion. In one embodiment, selecting the heading once sorts the data by carbon footprint in a descending order, while selecting again sorts in an ascending order. In other embodiments, an arrow or other symbol or element can be used to specify the sort order. Many other such interface approaches can be used as known or used in the art.

Figure 8:
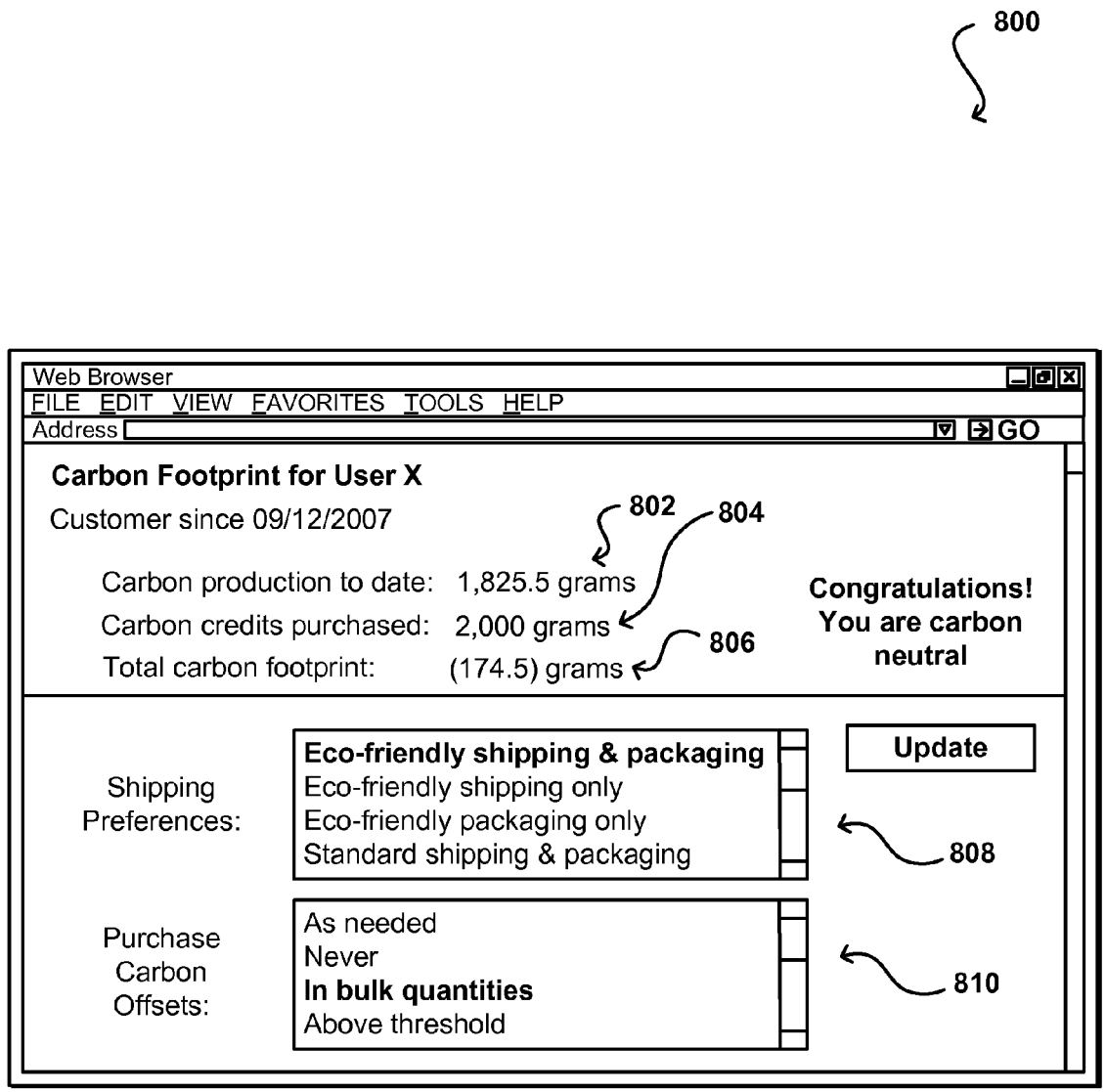
FIG. 8 illustrates an interface providing overall environmental impact information for a user that can be used in accordance with one embodiment.

As discussed, a customer can be provided with the ability to purchase offsets through the system, or purchase offsets independently and input that information into the system. In this way, a customer can track the overall net impact of that customer's transactions. FIG. 8 illustrates an example of an interface page 800 that can be used to display such information to a customer in accordance with one embodiment. In this example, the customer is provided with a total amount of carbon 802 determined to be introduced into the environment in response to the customer's transactions, including manufacture, shipping, packaging, returns, and any other related information. As should be apparent, any other such impact information can be tracked and displayed to the customer as well. The customer also can be presented with information

804 representing the number or amount of offsets purchased by the customer that have been applied against the transactions. The customer then also can be presented with the net carbon footprint 806 (carbon produced minus offsets) of that customer as a result of the transactions. A customer might also be presented with an option on such a page to purchase additional offsets to reduce the total impact.

A customer also can be presented, on the same page or a different page, with information relating to environmental options to be used as default values applied to each transaction. For example, a first option 808 enables a customer to specify a default option for shipping and/or packaging. In this example, the customer can specify whether to, by default, select the environmentally friendly shipping option, the environmentally friendly packaging option, neither, or both. Another option 810 enables a customer to specify when and how to purchase offsets for the various transactions. In this example, a customer can specify to purchase offsets as they are needed for each transaction, when a certain threshold is met, or in specific quantities at certain times.

Systems and methods in accordance with various embodiments also allow the environmental impact-based approaches discussed and suggested herein to be offered as services. For example, an electronic retailer might want to offer customers the ability to choose environmentally friendly shipping options. In such a situation, the retailer could subscribe to one of the services, then for any order or transaction the retailer could provide item information and the service could respond back with information such as shipping options, packaging options, impact information, etc. The retailer then can use the information to provide the shipping options to the customer, or can use the service to obtain the shipping (such as by forwarding information to a carrier for the transaction and then charging the retailer for providing the service). A retailer could pay a monthly or annual subscription fee, for example, or could pay on a per-transaction basis, kilobyte basis, or any other appropriate metric.

Such a retailer also can subscribe to such a service for item-specific impact information. For example, when a retailer receives a query with item information, the retailer could send information for the query to the service and receive back impact information, alternative items, sorted information, or any other type of information discussed or suggested herein for such purposes.

Although certain embodiments described above are described with respect to physical items, the methods and systems can be equally applied to items that are electronically fulfilled. For example, a user may be presented with the environmental impact information associated with the delivery of a physical medium containing a movie (e.g., a DVD, Blu-Ray disc, etc.) versus the environmental impact of the delivery of a movie downloaded or streamed to a user's selected client device over a network, such as the Internet.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dumb terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of offsetting an environmental impact of an electronic transaction for a user, comprising:
   under control of one or more computer systems configured with executable instructions,
      receiving a request from the user to obtain at least one item as part of an electronic transaction;
      determining, by the one or more computer systems, item-specific environmental impact information for each item, the item-specific environmental impact information being determined at least in part using at least one of a type of material or a volume of the item;
      determining, by the one or more computer systems, packaging-specific environmental impact information for the electronic transaction, the packaging-specific environmental impact information being determined at least in part using an amount or a type of packaging for the at least one item;
      determining, by the one or more computer systems, shipping-specific environmental impact information for the electronic transaction, the shipping-specific environmental impact information being determined at least in part using a number of deliveries or an overall distance of delivery for the at least one item; and
      allocating, by the one or more computer systems, a number of environmental credits to offset the environmental impact of the electronic transaction based at least in part upon the item-specific, packaging-specific, and shipping-specific environmental impact information,
      wherein the user is able to obtain an electronic transaction that has substantially zero net environmental impact for at least the determined types of environmental impact information.

2. The computer-implemented method of claim 1, wherein the number of environmental credits is allocated automatically as part of the electronic transaction.

3. The computer-implemented method of claim 1, further comprising:
   determining electronic marketplace-specific environmental impact information based at least in part upon the use of the electronic marketplace by the user.

4. The computer-implemented method of claim 1, further comprising:
   determining manufacturing-specific environmental impact information based at least in part upon a manufacturing process or type of manufacturing facility for each item.

5. A computer-implemented method of offsetting an environmental impact of an electronic transaction for a user, comprising:
   under control of one or more computer systems configured with executable instructions,
      receiving a request from the user to obtain at least one item as part of an electronic transaction;
      determining, by the one or more computer systems, an environmental impact of the electronic transaction, the one or more computer systems being capable of determining the environmental impact at least in part using information about the at least one item, packaging for the at least one item, shipping for the at least one item, and manufacture of the at least one item; and
      allocating, by the one or more computer systems, for the electronic transaction an amount of environmental offsets substantially corresponding to the determined environmental impact of the electronic transaction,
      wherein the user is able to obtain the at least one item with minimal net environmental impact.

6. The computer-implemented method of claim 5, wherein the allocating is done automatically by a provider of the electronic marketplace or in response to a selection by the user.

7. The computer-implemented method of claim 5, further comprising:
   displaying environmental impact information about the electronic transaction to the user; and
   enabling the user to select options to minimize the environmental impact before completing the transaction and allocating the amount of environmental offsets.

8. The computer-implemented method of claim 5, wherein the environmental impact for the at least one item includes at least one of an amount of recycled material, an amount of recyclable or non-biodegradable material, an effective landfill volume, a carbon footprint resulting from manufacture of each item, a delivery impact from the manufacturer of each item to a storage location, and an operational impact of the item.

9. The computer-implemented method of claim 5, wherein the environmental impact for shipping for the at least one item includes at least one of a carbon output of each delivery vehicle to be used for the transaction, a type of delivery vehicle, a number of delivery vehicles needed, a number of trips needed, and a total travel distance for the number of deliveries.

10. The computer-implemented method of claim 5, wherein the environmental impact for packaging the at least one item includes an amount of recycled material, an amount of recyclable or non-biodegradable material, an effective landfill volume, a carbon footprint resulting from manufacture of the packaging, an overall packaging volume, and a number of packages needed.

11. The computer-implemented method of claim 5, wherein at least a portion of the environmental offsets are purchased by the provider of the electronic marketplace or the user.

12. The computer-implemented method of claim 5, wherein the user is able to input information about environmental offsets obtained by the user separate from the electronic transaction that are able to be allocated to the electronic transaction.

13. The computer-implemented method of claim 5, wherein there are a plurality of types of environmental impact information available, and the user is able to select at least one of those types to be used in determining the environmental impact for the electronic transaction.

14. A system for offsetting an environmental impact of an electronic transaction, comprising
 a processor; and
 memory including instructions that, when executed by the processor, cause the system to:
  receive a request to obtain at least one item as part of an electronic transaction;
  determine an environmental impact of the electronic transaction, the instructions when executed cause the system to be capable of determining the environmental impact at least in part using information about the at least one item, packaging for the at least one item, shipping for the at least one item, and manufacture of the at least one item; and
  allocate for the electronic transaction an amount of environmental offsets substantially corresponding to the determined environmental impact of the electronic transaction,
 wherein the at least one item is capable of being provided with minimal net environmental impact.

15. The system of claim 14, wherein the allocating is done automatically by a provider of the electronic marketplace or in response to a selection by the user.

16. The system of claim 14, wherein the instructions when executed further cause the system to:
 display environmental impact information about the electronic transaction to the user; and
 enable the user to select options to minimize the environmental impact before completing the transaction and allocating the amount of environmental offsets.

17. The system of claim 14, wherein there are a plurality of types of environmental impact information available, and the user is able to select at least one of those types to be used in determining the environmental impact for the electronic transaction.

18. A non-transitory computer-readable storage medium including instructions that, when executed by a processor, cause the processor to:
 receive a request to obtain at least one item as part of an electronic transaction;
 determine an environmental impact of the electronic transaction, the instructions when executed cause the processor to be capable of determining the environmental impact at least in part using information about the at least one item, packaging for the at least one item, shipping for the at least one item, and manufacture of the at least one item; and
 allocate for the electronic transaction an amount of environmental offsets substantially corresponding to the determined environmental impact of the electronic transaction,
 wherein the at least one item is capable of being provided with minimal net environmental impact.

19. The non-transitory computer-readable storage medium of claim 18, wherein the allocating is done automatically by a provider of the electronic marketplace or in response to a selection by the user.

20. The non-transitory computer-readable storage medium of claim 18, wherein the instructions when executed further cause the processor to:
 display environmental impact information about the electronic transaction to the user; and
 enable the user to select options to minimize the environmental impact before completing the transaction and allocating the amount of environmental offsets.

\* \* \* \* \*